United States Patent
Kunkes et al.

(10) Patent No.: US 12,420,271 B2
(45) Date of Patent: Sep. 23, 2025

(54) ZEOLITE SYNTHESIS

(71) Applicant: BASF MOBILE EMISSIONS CATALYSTS LLC, Iselin, NJ (US)

(72) Inventors: Eduard L. Kunkes, Iselin, NJ (US); Maritza I. Ortega, Haledon, NJ (US)

(73) Assignee: BASF Mobile Emissions Catalysts LLC, Iselin, NJ (US)

(*) Notice: Subject to any disclaimer, the term of this patent is extended or adjusted under 35 U.S.C. 154(b) by 645 days.

(21) Appl. No.: 17/756,062

(22) PCT Filed: Nov. 18, 2020

(86) PCT No.: PCT/US2020/060982
§ 371 (c)(1),
(2) Date: May 16, 2022

(87) PCT Pub. No.: WO2021/101947
PCT Pub. Date: May 27, 2021

(65) Prior Publication Data
US 2022/0401932 A1    Dec. 22, 2022

Related U.S. Application Data

(60) Provisional application No. 62/937,572, filed on Nov. 19, 2019.

(51) Int. Cl.
*B01J 29/08* (2006.01)
*B01J 29/70* (2006.01)
(Continued)

(52) U.S. Cl.
CPC ......... *B01J 29/084* (2013.01); *B01J 29/7015* (2013.01); *B01J 37/088* (2013.01); *B01J 37/30* (2013.01)

(58) Field of Classification Search
CPC .... B01J 29/084; B01J 29/7015; B01J 37/088; B01J 37/30; B01J 29/70; Y02T 10/12; C01B 39/48
See application file for complete search history.

(56) References Cited

U.S. PATENT DOCUMENTS 4,961,836 A   10/1990 Murphy
9,174,849 B2  11/2015 Moini et al.
(Continued)

FOREIGN PATENT DOCUMENTS

CN   101058764 A   10/2007
CN   106315612 A    1/2017
(Continued)

OTHER PUBLICATIONS https://web.archive.org/web/20180215233043/https://www.utsc.utoronto.ca/webapps/chemistryonline/production/reflux.php (Year: 2018).*
(Continued)

*Primary Examiner* — Daniel C. McCracken
*Assistant Examiner* — Joshua Maxwell Speer
(74) *Attorney, Agent, or Firm* — DLA Piper LLP (US)

(57) ABSTRACT

The present disclosure provides methods of synthesizing a zeolite with a silica-to-alumina ratio (SAR) of 10 or greater comprising, e.g.: forming a reaction mixture including at least one alumina source, at least one silica source, and at least one organic structure directing agent, wherein the reaction mixture has a solids content of about 10% or greater, and crystallizing the reaction mixture at a temperature of 100° C. or less at atmospheric pressure to form a zeolite.

24 Claims, 7 Drawing Sheets

(51) Int. Cl.
  *B01J 37/08* (2006.01)
  *B01J 37/30* (2006.01)

(56) References Cited

U.S. PATENT DOCUMENTS

| | | | |
|---|---|---|---|
| 10,556,802 | B2 | 2/2020 | Takamitsu et al. |
| 2011/0020204 | A1 | 1/2011 | Bull et al. |
| 2013/0052125 | A1* | 2/2013 | Moini .................. C01B 39/48 |
| | | | 977/773 |
| 2016/0023912 | A1 | 1/2016 | Goel et al. |
| 2017/0095804 | A1 | 4/2017 | Janssens et al. |
| 2018/0093258 | A1 | 4/2018 | Chen et al. |
| 2018/0093259 | A1 | 4/2018 | Chen et al. |
| 2018/0230017 | A1* | 8/2018 | Ishikawa .............. C01B 39/48 |
| 2019/0351399 | A1 | 11/2019 | Sree et al. |
| 2021/0171357 | A1* | 6/2021 | Moini .................... F01N 3/2066 |

FOREIGN PATENT DOCUMENTS

| | | |
|---|---|---|
| CN | 109963811 A | 7/2019 |
| GB | 2546365 A | 7/2017 |
| JP | 2010536692 A | 12/2010 |
| JP | 2012-508096 A | 4/2012 |
| JP | 2014-527017 A | 10/2014 |
| JP | 2017-48105 A | 3/2017 |
| JP | 2017-512743 A | 5/2017 |
| JP | 2017-521347 A | 8/2017 |
| JP | 2017-178745 A | 10/2017 |
| JP | 2019-034879 A | 3/2019 |
| WO | 2009023202 A2 | 2/2009 |
| WO | WO 2019/180663 A1 | 9/2019 |

OTHER PUBLICATIONS

International Search Report dated Feb. 25, 2021, PCT/US2020/060982.

First Office Action dated Jul. 13, 2023, of counterpart Chinese Patent Application No. 202080078864.9, along with an English machine translation.

* cited by examiner

ZEOLITE SYNTHESIS

This application is a national stage filing under 35 U.S.C. § 371 of International Application No. PCT/US2020/060982, filed on Nov. 18, 2020, which claims the benefit of priority to U.S. Provisional Application No. 62/937,572, filed on Nov. 19, 2019, the contents of each are incorporated by reference herein in their entirety.

The present disclosure relates generally to the field of selective catalytic reduction (SCR) catalysts and to methods of preparing and using such catalysts to selectively reduce nitrogen oxides.

Emissions of diesel engines include particulate matter (PM), nitrogen oxides ($NO_x$), unburned hydrocarbons (HC), and carbon monoxide (CO). $NO_x$ is a term used to describe various chemical species of nitrogen oxides, including nitrogen monoxide (NO) and nitrogen dioxide ($NO_2$), among others. The two major components of exhaust particulate matter are the soluble organic fraction (SOF) and the soot fraction. The SOF condenses on the soot in layers, and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon. The HC content of exhaust can vary depending on engine type and operating parameters, but typically includes a variety of short-chain hydrocarbons such as methane, ethene, ethyne, propene, and the like.

Various methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent.

Catalysts employed in the SCR process ideally should be able to retain good catalytic activity over a wide range of temperature, such as, for example, 200° C. to 600° C. or higher, under hydrothermal conditions. SCR catalysts are commonly exposed to high temperature hydrothermal conditions, such as during the regeneration of a soot filter, which is a component of the exhaust gas treatment system used for the removal of particles.

Molecular sieves such as zeolites have been used in the SCR of nitrogen oxides with a reductant such as ammonia, urea, or a hydrocarbon in the presence of oxygen. Zeolites are crystalline materials having rather uniform pore sizes, which, depending upon the type of zeolite and the types and amounts of cations included in the zeolite, range from about 3 to about 10 Angstroms in diameter. Zeolites having 8 member-ring pore openings and double-six ring secondary building units, such as, e.g., those having cage-like structures, are well-suited for use as SCR catalysts. A specific type of zeolite having these properties is chabazite (CHA), which is a small pore zeolite with 8 member-ring pore openings (about 3.8 Angstroms) accessible through its 3-dimensional porosity. A cage-like structure results from the connection of double six-ring building units by 4 rings. Molecular sieves having CHA framework structures may be prepared, for instance, according to methods disclosed in U.S. Pat. Nos. 4,503,024, 4,544,538 and 6,709,644 and "Verified Synthesis of Zeolites Second Edition," Elsevier 2001 p. 123, each of which is incorporated herein by reference.

Typical methods of preparing certain CHA zeolites (such as, e.g., zeolites with SAR values of 10 or greater) involve hydrothermal synthesis under relatively harsh conditions. For example, in the '538 patent referenced above, zeolites are prepared via hydrothermal crystallization under pressure, typically in an autoclave. Similarly, the '644 patent referenced above describes a process of hydrothermal crystallization to prepare CHA (SSZ-64) crystals under autogenous pressure at a temperature between 100° C. and 200° C. over the course of, e.g., about 3 days to about 20 days. Although less harsh conditions are known for the preparation of certain zeolites, these methods are generally limited to the preparation of zeolites with lower silica-to-alumina ratio (SAR) values.

Accordingly, there is a need for alternative methods for the production of CHA (and other zeolites) of varying SARs without the harsh conditions previously described.

BRIEF DESCRIPTION OF THE DRAWINGS

In order to provide an understanding of certain embodiments of the disclosure, reference is made to the appended drawings, which are not necessarily drawn to scale, and in which reference numerals refer to components of example embodiments of the present disclosure. The drawings are provided by way of example only and should not be construed as limiting the scope of the disclosure.

Figure 1A:
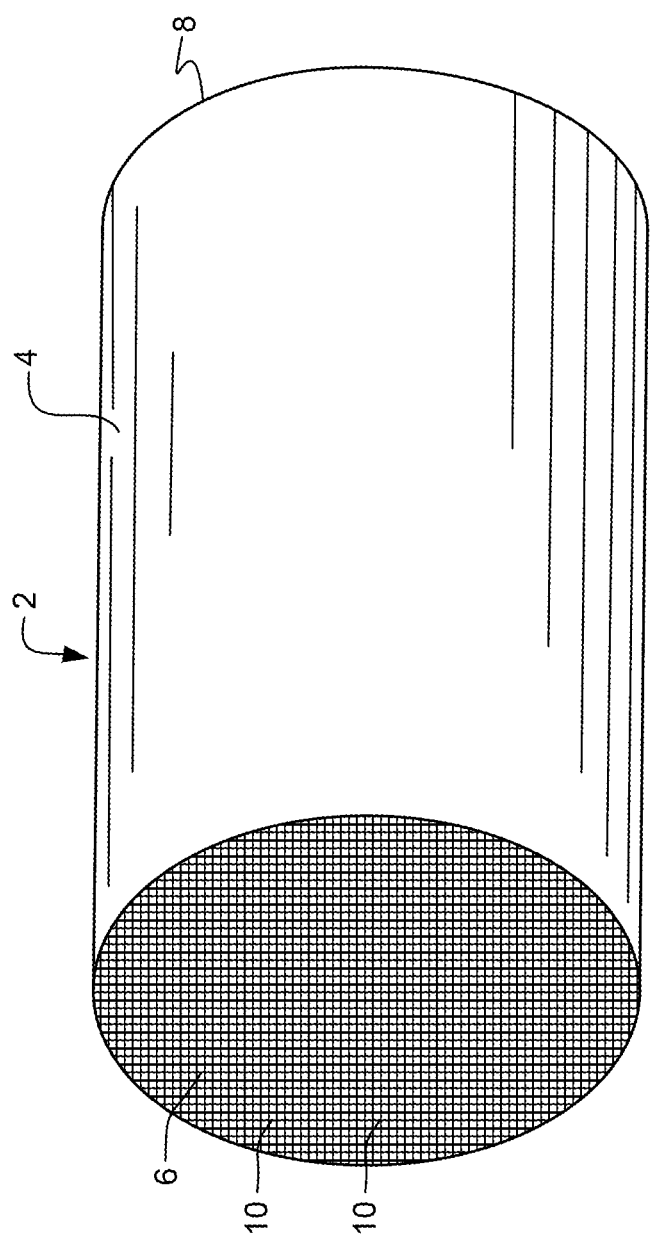
FIG. 1A depicts a perspective view of a honeycomb-type substrate which may comprise a catalyst composition of the present disclosure.

The present disclosure provides a method of synthesizing a zeolite using less harsh conditions than those generally employed for the production of, e.g., CHA zeolites with high silica-to-alumina (SAR) ratios. In particular, the methods outlined herein may allow for such production at lower temperatures and/or corresponding lower temperatures. Advantageously, the disclosed processes can be conducted without requiring autogenous pressure and/or in a simple stirred vessel (e.g., at atmospheric pressure). The disclosure further provides corresponding zeolite products thus prepared, as well as emission treatment systems and methods of exhaust gas treatment that utilize the zeolite product(s).

These and other features, aspects, and advantages of the disclosure will be apparent from the following detailed description together with the accompanying drawings, which are briefly described below. The disclosure includes any combination of two, three, four, or more of the embodiments as well as combinations of any two, three, four, or more features or elements set forth in this disclosure, regardless of whether such features or elements are expressly combined in a specific embodiment description herein, unless the context clearly dictates otherwise. This disclosure is intended to be read holistically such that any separable features or elements of the present disclosure, in any of its various aspects and embodiments, should be viewed as intended to be combinable unless the context clearly dictates otherwise. Other aspects and advantages of the present disclosure will become apparent from the following.

The disclosure is not limited to the details of construction or process steps set forth in the following description. The disclosure is capable of other embodiments and of being practiced or being carried out in various ways. It is to be understood that the example embodiments described herein are merely illustrative of the principles and applications of the present disclosure. It will be apparent to those skilled in the art that various modifications and variations can be made to the methods and apparatuses of the present disclosure without departing from the spirit and scope of the disclosure. Thus, it is intended that the present disclosure include modifications and variations that are within the scope of the appended claims and their equivalents.

In one aspect of the disclosure is provided a method of synthesizing an aluminosilicate zeolite with a silica-to-alumina ratio (SAR) of 10 or greater, comprising: i) forming a reaction mixture comprising at least one alumina source, at least one silica source, and at least one organic structure directing agent, wherein the reaction mixture has a solids content of about 10% or greater (such as, e.g., by weight); and ii) crystallizing the reaction mixture at a temperature of 100° C. or less in a vessel open to an atmosphere to form the aluminosilicate zeolite.

The method can be used to provide various types of aluminosilicate zeolite products. For example, in some embodiments, the aluminosilicate zeolite comprises zeolites with an 8 ring pore size. In some embodiments, the aluminosilicate zeolite comprises zeolites with frameworks containing double six ring (D6r) subunits. In some embodiments, the aluminosilicate zeolite comprises zeolites with frameworks chosen from AEI, AFX, CHA, LEV, AFT, EAB, KFI, SAT, TSC, SAV, ERI, LTA and combinations of any of the preceding. In some embodiments, the aluminosilicate zeolite comprises zeolites with a CHA crystalline framework.

For example, in some embodiments, the aluminosilicate zeolite comprises at least one zeolite with an 8 ring pore size. In some embodiments, the aluminosilicate zeolite comprises at least one zeolite with frameworks containing double six ring (D6r) subunits. In some embodiments, the aluminosilicate zeolite comprises at least one with a framework chosen from AEI, AFX, CHA, LEV, AFT, EAB, KFI, SAT, TSC, SAV, ERI, and LTA. In some embodiments, the aluminosilicate zeolite comprises at least one zeolite with a CHA crystalline framework.

In some embodiments, the method provides aluminosilicate zeolites with silica-to-alumina ratio (SAR) values that are relatively high, although the method is not limited thereto. In some embodiments, the aluminosilicate zeolite has an SAR of 15 or greater. In some embodiments, the aluminosilicate zeolite has an SAR of 20 or greater. In some embodiments, the aluminosilicate zeolite has an SAR of 10 to 30.

In some embodiments, the solids content of the reaction mixture is about 15% or greater by weight. The at least one alumina source of the reaction mixture can vary and, in some embodiments, comprises a zeolite, such as, e.g., a zeolite with an FAU, LTL, LTA, or MOR crystalline framework. In some embodiments, the at least one alumina source comprises a zeolite with a FAU crystalline framework in the form of zeolite Y. The at least one organic structure directing agent can also vary and, in some embodiments, the at least one organic structure directing agent is a quaternary ammonium salt with substituents chosen from alkyl substituents, aromatic substituents, and combinations of any of the preceding. In some embodiments, the at least one organic structure directing agent is a quaternary ammonium salt with at least one substituent chosen from alkyl substituents, aromatic substituents, and combinations of any of the preceding. One non-limiting example of the at least one organic structure directing agent is tetramethylpiperidinium. The at least one silica source can also vary and, in some embodiments, the at least one silica source comprises an alkali metal silicate solution.

The parameters of the disclosed methods can vary. For example, the temperature at which the crystallizing step is conducted can vary, such as, in some embodiments, wherein the crystallizing step is conducted at a temperature of about 95° C. to 100° C. In some embodiments, the disclosed method does not require the crystallizing step to be performed in an autoclave. In some embodiments, the crystallizing step is conducted in a stirred vessel adapted with a reflux condenser. Stirring of the reaction mixture may be advantageous and, in some embodiments, the crystallizing step is conducted under stirring.

The method provided herein, in some embodiments, comprises one or more additional method steps. For example, the method can, in some embodiments, further comprise calcining the aluminosilicate zeolite to form a calcined zeolite in a $H^+$ form or a $Na^+$ form. The method can, in some embodiments, further comprise ion-exchanging the aluminosilicate zeolite with a promoter metal to form an ion-exchanged zeolite catalyst. In some embodiments, the method further comprises ion-exchanging the calcined zeolite with a promoter metal to form an ion-exchanged zeolite catalyst. Such promoter metals can vary and can be, for example, Fe or Cu.

Definitions

With respect to the terms used in this disclosure, the following definitions are provided.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of phrases such as "in one or more embodiments," "in certain embodiments," "in one embodiment" or "in an embodiment" in various places throughout this specification are not necessarily referring to the same embodiment(s) of the disclosure. Furthermore, the particular features, structures, materials, or characteristics may be combined in any suitable manner in one or more embodiments.

The articles "a" and "an" are used herein to refer to one or to more than one (i.e., to at least one) of the grammatical object of the article.

Any ranges cited herein are inclusive, i.e., the endpoints are included within the range unless otherwise specified.

The term "about" is used throughout this specification to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1%, or less than or equal to ±0.05%. All numeric values herein are modified by the term "about," whether or not explicitly indicated. A value modified by the term "about" includes the specific value. For instance, "about 5.0" includes 5.0.

The term "catalyst" or "catalyst material" or "catalytic material" refers to a material that promotes a reaction.

As used herein, the term "catalytic article" refers to an element that is used to promote a desired reaction. For example, a catalytic article may comprise a washcoat containing a catalytic species, such as, e.g., a catalyst composition, on a substrate, such as, e.g., a honeycomb substrate.

As used herein, the term "washcoat" has its usual meaning in the art of a thin, adherent coating of a catalytic or other material applied to a carrier substrate material, such as, e.g., a honeycomb-type carrier member, which is sufficiently porous to permit the passage of the gas stream being treated. As is understood in the art, a washcoat may be obtained from a dispersion of particles in slurry, which may be applied to a substrate, dried, and calcined to provide the porous washcoat.

As used herein, the term "substrate" refers to a monolithic material onto which a catalyst material is placed, typically in the form of a washcoat.

As used herein, the term "stream" broadly refers to any combination of flowing gas that may contain solid or liquid particulate matter. The term "gaseous stream" or "exhaust gas stream," as used herein, means a stream of gaseous constituents, such as, e.g., the exhaust of an engine, which may contain entrained non-gaseous components such as liquid droplets, solid particulates, and the like. The exhaust gas stream of an engine may further comprise combustion products, products of incomplete combustion, oxides of nitrogen, combustible and/or carbonaceous particulate matter (soot), and un-reacted oxygen and nitrogen.

As used herein, the terms "particulate filter" and "soot filter" refer to a filter designed to remove particulate matter such as soot from an exhaust gas stream.

As used herein, the term "BET surface area" has its usual meaning of referring to the Brunauer-Emmett-Teller (BET) method for determining surface area by $N_2$ adsorption. Pore diameter and pore volume can also be determined using BET-type $N_2$ adsorption or desorption experiments, as would be understood by those of ordinary skill in the art.

As used herein, "support" in the context of a catalytic material or catalyst washcoat refers to a material that receives a catalyst (including, for example, precious metals, stabilizers, promoters, binders, and the like) through precipitation, association, dispersion, impregnation, or other suitable methods.

As used herein, the term "selective catalytic reduction" (SCR) refers to a catalytic process of reducing oxides of nitrogen to dinitrogen ($N_2$) using a nitrogenous reductant. As used herein, the terms "nitrogen oxides" or "$NO_x$" designate oxides of nitrogen. The SCR process uses catalytic reduction of nitrogen oxides with ammonia to form nitrogen and water, typically according to the following reactions.

$$4NO+4NH_3+O_2 \rightarrow 4N_2+6H_2O \text{ (standard SCR reaction)}$$

$$2NO_2+4NH_3 \rightarrow 3N_2+6H_2O \text{ (slow SCR reaction)}$$

$$NO+NO_2+2NH_3 \rightarrow 2N_2+3H_2O \text{ (fast SCR reaction)}$$

As used herein, the term "zeolite" refers to a specific example of a molecular sieve including silicon and aluminum atoms. Zeolites are substantially crystalline materials having relatively uniform pore sizes which, depending upon the type of zeolite and the types and amounts of cations included in the zeolite lattice, range from about 3 to about 10 Angstroms in diameter.

References to an "aluminosilicate zeolite" framework type herein limit the material to molecular sieves that do not include phosphorus or other metals substituted in the framework. However, to be clear, as used herein, "aluminosilicate zeolite" excludes aluminophosphate materials such as, e.g., SAPO, ALPO, and MeAPO materials, and the broader term "zeolite" is intended to include aluminosilicates and aluminophosphates.

Zeolitic CHA-framework type molecular sieves, otherwise referred to herein as "CHA zeolites," include a zeolite group with approximate formula: $(Ca,Na_2,K_2,Mg)Al_2Si_4O_{12}.6H_2O$ (such as, e.g., hydrated calcium aluminum silicate). Three synthetic forms of zeolitic CHA-framework type molecular sieves are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, each of which is hereby incorporated by reference. Synthesis of another synthetic form of zeolitic CHA-framework type, SSZ-13, is described in U.S. Pat. No. 4,544,538, which is hereby incorporated by reference.

As used herein, the term "promoted" refers to a metal component (such as, e.g., a "promoter metal") that is intentionally added to the molecular sieve material, as opposed to impurities inherent in the molecular sieve. Thus, a promoter is intentionally added to enhance an activity of a catalyst compared to a catalyst that does not have the promoter intentionally added. In order to promote the selective catalytic reduction of nitrogen oxides in the presence of ammonia, in one or more embodiments, a suitable metal(s) is independently exchanged into the molecular sieve.

EXAMPLE EMBODIMENTS

Without limitation, some embodiments of the present disclosure include:

1. A method of synthesizing an aluminosilicate zeolite with a silica-to-alumina ratio (SAR) of 10 or greater, comprising:
    forming a reaction mixture comprising at least one alumina source, at least one silica source, and at least one organic structure directing agent, wherein the reaction mixture has a solids content of about 10% or greater, and
    crystallizing the reaction mixture at a temperature of about 100° C. or less in a vessel open to an atmosphere to form the aluminosilicate zeolite.

2. The method of Embodiment 1, wherein the aluminosilicate zeolite comprises zeolites with an 8 ring pore size.

3. The method of Embodiment 1 or 2, wherein the aluminosilicate zeolite comprise zeolites with frameworks containing double six ring (D6r) subunits.

4. The method of any one of Embodiments 1 to 3, wherein the aluminosilicate zeolite comprises zeolites with frameworks chosen from AEI, AFX, CHA, LEV, AFT, EAB, KFI, SAT, TSC, SAV, ERI, LTA, and combinations of any of the preceding.

5. The method of any one of Embodiments 1 to 4, wherein the aluminosilicate zeolite comprises zeolites with a CHA crystalline framework.

6. The method of any one of Embodiments 1 to 5, wherein the aluminosilicate zeolite has an SAR of 15 or greater.

7. The method of any one of Embodiments 1 to 6, wherein the aluminosilicate zeolite has an SAR of 20 or greater.

8. The method of any one of Embodiments 1 to 5, wherein the aluminosilicate zeolite has an SAR of 10 to 30.

9. The method of any one of Embodiments 1 to 8, wherein the solids content of the reaction mixture is about 15% or greater.

10. The method of any one of Embodiments 1 to 9, wherein the at least one alumina source comprises a zeolite with an FAU, LTL, LTA, or MOR crystalline framework.

11. The method of Embodiment 10, wherein the zeolite with an FAU crystalline framework is zeolite Y.

12. The method of any one of Embodiments 1 to 11, wherein the at least one organic structure directing agent is a quaternary ammonium salt with at least one substituent chosen from alkyl substituents, aromatic substituents, and combinations of any of the preceding.

13. The method of any one of Embodiments 1 to 12, wherein the at least one organic structure directing agent is tetramethylpiperidinium.

14. The method of any one of Embodiments 1 to 13, wherein the temperature ranges from about 95° C. to about 100° C.

15. The method of any one of Embodiments 1 to 14, wherein the vessel is a stirred vessel adapted with a reflux condenser.

16. The method of any one of Embodiments 1 to 15, wherein crystallizing the reaction mixture is conducted under stirring.

17. The method of any one of Embodiments 1 to 16, wherein the at least one silica source comprises an alkali metal silicate solution.

18. The method of any one of Embodiments 1 to 17, further comprising calcining the aluminosilicate zeolite to form a calcined zeolite in a $H^+$ form or a $Na^+$ form.

19. The method of Embodiment 18, further comprising ion-exchanging the calcined zeolite with a promoter metal to form an ion-exchanged zeolite catalyst.

20. The method of any one of Embodiments 1 to 17, further comprising ion-exchanging the aluminosilicate zeolite with a promoter metal to form an ion-exchanged zeolite catalyst.

21. The method of Embodiment 19 or 20, wherein the promoter metal is Fe or Cu.

22. A substrate comprising a metal-promoted zeolite catalyst composition prepared by a method of any one of Embodiments 18 to 21.

23. The substrate of Embodiment 22, wherein the metal-promoted zeolite catalyst composition is coated on the substrate.

24. The substrate of Embodiment 23, wherein metal-promoted zeolite catalyst composition is coated on the substrate in the form of a washcoat.

25. The substrate of Embodiment 24, wherein the washcoat comprises a binder chosen from silica, alumina, titania, zirconia, ceria, and combinations of any of the preceding.

26. The substrate of Embodiment 25, wherein a loading of the binder is about 0.1 wt. % to about 10 wt. % based on the weight of the washcoat.

27. The substrate of any one of Embodiments 22 to 26, wherein the substrate is chosen from flow-through honeycomb monoliths and particulate filters.

28. The substrate of any one of Embodiments 22 to 27, wherein the substrate is a ceramic or metal having a honeycomb structure.

29. The substrate of any one of Embodiments 22 to 27, wherein the substrate is gasoline particulate filter or a soot filter.

30. The substrate of any one of Embodiments 22 to 29, comprising one or more catalyst layers on an inlet and/or outlet wall of the substrate.

31. The substrate of any one of Embodiments 22 to 30, comprising combinations of at least two catalyst layers on an inlet and/or outlet wall of the substrate.

32. An exhaust gas treatment system comprising an engine and a catalyst composition prepared by a method of any one of Embodiments 18 to 21.

33. The exhaust gas treatment system of Embodiment 32, wherein the engine is a lead burn engine.

34. The exhaust gas treatment system of Embodiment 32 or 33, wherein the engine is a diesel engine or a lean burn gasoline engine.

35. A method of treating an exhaust gas stream of an engine, comprising:
 placing a catalyst comprising a metal-exchanged zeolite prepared by a method of any one of Embodiments 18 to 21 downstream from the engine; and
 flowing the exhaust gas stream of the engine over the catalyst.

36. The method of Embodiment 35, wherein the engine is a lead burn engine.

37. The method of Embodiment 35 or 36, wherein the engine is a diesel engine or a lean burn gasoline engine.

38. The method of any one of Embodiments 35 to 37, further comprising placing additional catalyst components downstream from the engine.

In some embodiments, the disclosed zeolites are promoted with a promoter metal chosen from alkali metals, alkaline earth metals, transition metals chosen from Groups IIIB, IVB, VB, VIB, VIIB, VIIIB, IB, and IIB, Group IIIA elements, Group IVA elements, lanthanides, actinides, and combinations of any of the preceding. In some embodiments, promoter metals (such as, e.g., further promoter metals) that can be used to prepare promoted zeolites of the disclosed catalyst compositions include, but are not limited to, copper (Cu), cobalt (Co), nickel (Ni), lanthanum (La), manganese (Mn), iron (Fe), vanadium (V), silver (Ag), cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), tungsten (W), and combinations of any of the preceding. The promoter metal content, calculated as the oxide, in one or more embodiments, independently ranges from about 0.01 wt. % to about 15 wt. %, from about 0.5 wt. % to about 12 wt. %, or from about 1.0 wt. % to about 10 wt. %, based on the total weight of the corresponding calcined zeolite (including the promoter metal) and reported on a volatile-free basis. In some embodiments, the promoter metal is copper or iron.

A promoter metal can be exchanged into the zeolite by a liquid phase exchange process, where the soluble metal ions (e.g., one or more soluble metal ions) exchange with the proton or ammonium or sodium ions (e.g., one or more ions independently chosen from proton, ammonium, or sodium ions) associated with the zeolite. The exchange can also be carried out by a solid-state process, where promoter metal oxide or metal salt solid particles are mixed with a zeolite powder and processed under certain temperature and gas environments that may or may not contain steam. The exchange process can also be accomplished via an in-situ process during slurry preparation, where fine metal oxide particles are suspended in a zeolite slurry under conditions suitable for solid-liquid interaction.

In one aspect, the disclosure provides a method for forming a zeolite under reasonably mild conditions. It has been surprisingly discovered that even zeolites with high SAR values (such as, e.g., SAR values of 10 or greater) can be crystallized under such conditions, as will be outlined herein below.

In some embodiments, methods of the disclosure comprise forming a reaction mixture comprising at least one alumina source that includes a zeolite, at least one silica source, at least one organic structure directing agent, and, optionally, a secondary alkali metal cation source. The secondary alkali metal cation source may boost the alkali metal content of the reaction mixture. In some embodiments, the reaction mixture is provided under alkaline aqueous conditions. Ratios of the various components and, in particular, the $OH:SiO_2$ ratio and the $Na/SiO_2$ ratio, can be adjusted, e.g., by the addition of an acid source (such as, e.g., sulfuric acid) and/or a sodium source (such as, e.g., sodium sulfate).

The at least one silica source can vary and is commonly chosen from sources that include an alkali metal silicate solution and/or colloidal silica. An alkali metal, if present in the at least silica source can be, for example, lithium, sodium, potassium, rubidium, cesium, or francium. In certain embodiments, the alkali metal is sodium or potassium (such as, e.g., when the at least one silica source comprises sodium silicate or potassium silicate). Where the at least one silica source comprises an alkali metal silicate, the individual metal (M)/Si molar ratio is at least about 0.4, or at least about 0.5, or at least about 0.6, or at least about 0.7, or at least about 0.8, with non-limiting example ranges of about 0.4 to about 1.2, or about 0.6 to about 1.0, or about 0.7 to about 0.9.

The zeolite included in the at least one alumina source can vary, and will include various zeolite materials known in the art, such as, e.g., various aluminosilicate zeolites. In certain embodiments, zeolites having the FAU crystalline structure, which are formed by 12-ring structures and have channels of about 7.4 Å, are used. Non-limiting examples of such zeolites include faujasite, zeolite X, zeolite Y, LZ-210, and SAPO-37. Such zeolites are characterized by a 3-dimensional pore structure with pores running perpendicular to each other in the x, y, and z planes, with secondary building units 4, 6, and 6-6. An example SAR range for the bulk FAU zeolite material is about 3 to about 6, typically with a unit cell size range of 24.35 to 24.65, as determined by XRD. Zeolite Y is useful for certain embodiments of the disclosure. The FAU zeolite may be used in alkali metal form, such as, e.g., the $Na^+$ form. In one particular embodiment, the FAU zeolite is in the sodium form and comprises from about 2.5% to about 13% $Na_2O$ by weight.

A non-limiting example of an organic structure directing agent for this synthesis is adamantyl trimethylammonium hydroxide, although other amines and/or quaternary ammonium salts may be substituted or added. Non-limiting examples include quaternary ammonium cations with substituents (such as, e.g., one or more substituents) chosen from alkyl, adamantyl, cyclohexyl, aromatic, and combinations of any of the preceding. Additional non-limiting examples of organic structure directing agents include cyclohexyl trimethylammonium, benzyl trimethylammonium, and dimethylpiperidinium hydroxide.

Hydroxide ions are the only necessary mineralizing agent needed in the reaction mixture, and the amount of hydroxide needed to achieve the ratios noted above can be provided solely from the alkali metal silicate solution, and to a lesser extent, from the organic structure directing agent source. If desired, hydroxide ion content can be supplemented with additional hydroxide ion sources such as NaOH or KOH.

In some embodiments of the present disclosure, the reaction does not require the use of elevated pressure (such as, e.g., reaction within an autoclave), as typically required for the production of various zeolites. It is known, as referenced above, that some zeolites can be produced without such harsh conditions, but it is generally understood that the preparation of zeolites with higher SAR values (such as, e.g., about 10 or greater) requires these harsh conditions.

As such, the disclosed method generally comprises crystallizing the reaction mixture in the absence of an applied pressure (such as, e.g., at atmospheric pressure). For example, in certain embodiments, the crystallization reaction can be conducted within a vessel that is open to air, such as, e.g., a vessel equipped with a reflux condenser. The method may involve heating the reaction mixture, with non-limiting examples of reaction temperatures in the range of about 100° C. to about 160° C. (e.g., about 110° C. to about 160° C.).

Higher temperatures may, in some embodiments, lead to greater crystallization percentage (i.e., greater conversion to product), all other parameters being equal. It was also observed that the rate of crystallization increased markedly with decreasing molar ratio of water to silica, i.e., $H_2O/SiO_2$ ratio (increasing solids content). The solids content of a zeolite gel is defined in the following manner:

Solids content %=(moles of $Al_2O_3$ equivalent in gel)×(101.96 g/mol)+(moles of $SiO_2$ equivalent in gel)×(60.08 g/mol))×100/(total mass of gel)

By modulating the solids content of the reaction mixture and the crystallizing temperature, it was surprisingly discovered that a suitable extent of crystallization can be achieved at atmospheric pressure. Typical reaction times can vary, depending, e.g., on the solids content and the temperature, but generally are between about 30 hours to about 3 days.

In some embodiments, crystallization of about 50% or greater can be obtained at an atmospheric pressure and a temperature of about 110° C. or greater with a reasonably high solids content (such as, e.g., a $H_2O/SiO_2$ ratio of about 15 or less). In some embodiments, crystallization of about 50% or greater can be obtained at an atmospheric pressure and a lower solids content (such as, e.g., a $H_2O/SiO_2$ ratio of greater than about 15, such as about 15 to about 30) with a correspondingly higher reaction temperature (such as, e.g., about 130° C. or greater). Higher crystallization percentages (such as, e.g., greater than 90%) can be obtained by further increasing the temperature and/or solids content. For example, in some embodiments, greater than 90% crystallization can be obtained for a reaction mixture with a $H_2O/SiO_2$ ratio of about 15 or less at a temperature of at least about 120° C. In some embodiments, greater than 90% crystallization can be obtained for a reaction mixture with a higher solids content (such as, e.g., a $H_2O/SiO_2$ ratio of greater than about 15, such as about 15 to about 30) but with an increased temperature relative to the prior embodiment, such as, e.g., a temperature of about 140° C. or greater.

Optionally, the product may be centrifuged. Organic additives may be used to help with the handling and isolation of the solid product. Spray-drying is an optional step in the processing of the product. The solid zeolite product thus obtained may be thermally treated or calcined in air or nitrogen. Typical calcination temperatures range from about 400° C. to about 850° C. (such as, e.g., about 500° C. to about 700° C.) over a period of about 1 to about 10 hours. Following initial calcination, the zeolite product is commonly primarily in the alkali metal form (such as, e.g., a $Na^+$ form). Optionally, single or multiple ammonia ion exchanges can be used to yield a $NH_4^+$ form of the zeolite, which is optionally further calcined to form a $H^+$ form.

In specific embodiments, the zeolite is further ion-exchanged with a promoter metal to form a metal-promoted zeolite catalyst. For example, copper or iron can be ion-exchanged to form a copper or iron-exchanged zeolite. Ion exchange can be conducted using conventional methods. For example, copper can be ion-exchanged in some embodiments using copper oxide or copper acetate. The copper loading obtained can be, for example, defined based on the Cu/Al molar ratio and can be, for example, about 0.2 to about 0.5 Cu/Al.

In some embodiments, the zeolite crystals resulting from the disclosed crystallization may be about 80% to about 99% crystalline or about 90% to about 97% crystalline. The method, in some embodiments, may be useful for the preparation of a zeolite product with a CHA structure. However, it is not limited thereto. In some embodiments, the disclosed method can be employed for the production of aluminosilicate zeolite crystal seeds with an 8 ring pore size, having structures chosen from AEI, AFX, CHA, LEV, AFT, EAB, KFI, SAT, TSC, SAV, ERI, LTA and combinations of any of the preceding. In some embodiments, the method can be employed for the production of ZSM-5 zeolites.

The zeolite product can be characterized by SAR range. As noted, in some embodiments, the disclosed method can be employed for the production of zeolites with a range of SAR values; however, it is particularly relevant in the context of the production of zeolites with higher SAR values, as these have not heretofore been prepared under mild conditions. As such, although this method is broadly applicable, in certain embodiments, it is employed for the production of a zeolite product with an SAR of about 10 or greater, about 12 or greater, about 15 or greater, or about 20 or greater, such as, e.g., products with an SAR of about 10 to about 30, about 12 to about 30, about 15 to about 30, about 18 to about 30, or about 20 to about 30.

In certain embodiments, a metal-promoted zeolite material prepared according to the method outlined herein can be characterized by SCR activity at various temperatures. In particular embodiments, metal-promoted zeolites as provided herein exhibit comparable SCR activity at various temperatures as compared with comparable metal-promoted zeolites prepared via conventional methods (i.e., those requiring high pressure). In particular, the disclosed method can provide metal-promoted zeolite material characterized by SCR activity after thermal aging treatment (e.g., at about 650° C. (HDD) or at about 800° C. (LDD)), wherein the $NO_x$ conversion percentage of the metal-promoted zeolite material of the disclosure is within about 10% or within about 20% that of a comparative metal-promoted zeolite material with the same metal loading at one or both of an exhaust gas temperature of about 200° C. and about 600° C., the comparative zeolite prepared using comparative process as described in the Example (e.g., Sample B). For example, the comparative metal-promoted zeolite material could be a zeolite material made using a reaction mixture that is crystallized under autogenous pressure.

Substrate

In one or more embodiments, a metal-promoted zeolite catalyst composition provided as described herein is disposed on a substrate. A washcoat is formed by preparing a slurry containing a specified solids content (e.g., about 30% to about 90% by weight) of a catalyst in a liquid, which is then coated onto a substrate and dried to provide a washcoat layer. The washcoat containing the metal-promoted molecular sieve as provided herein can optionally comprise a binder chosen from silica, alumina, titania, zirconia, ceria, and combinations of any of the preceding. The loading of the binder is typically about 0.1 wt. % to about 10 wt. % based on the weight of the washcoat.

In one or more embodiments, the substrate is chosen from flow-through honeycomb monoliths and particulate filters, and the catalytic material(s) is/are applied to the substrate as a washcoat.

Figure 1B:
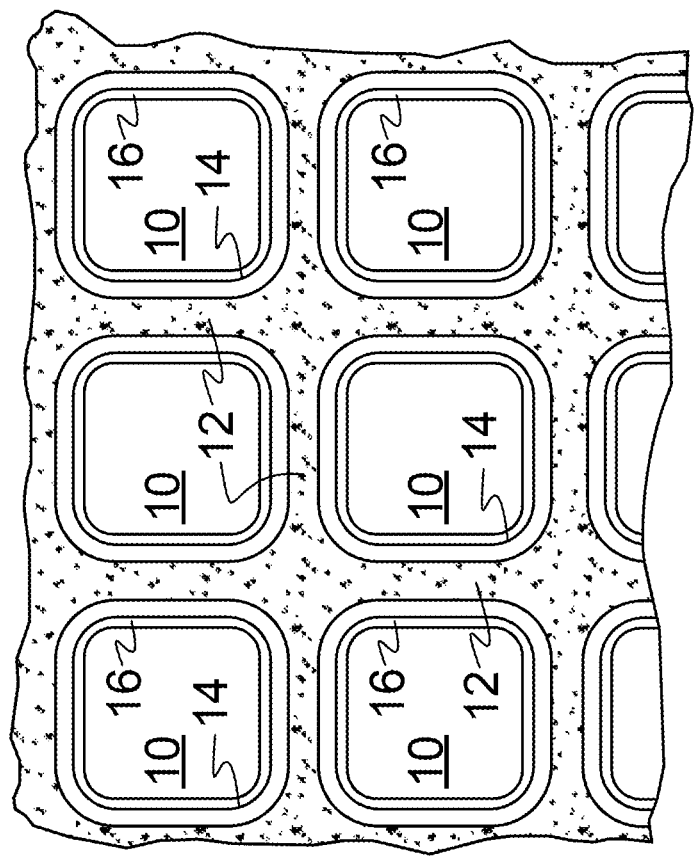
FIG. 1B depicts a partial cross-sectional view enlarged relative to FIG. 1A and taken along a plane parallel to the end faces of the carrier of FIG. 1A, which shows an enlarged view of a plurality of the gas flow passages shown in FIG. 1A.

FIGS. 1A and 1B illustrate an example substrate 2 in the form of a flow-through substrate coated with a catalyst composition as described herein. Referring to FIG. 1A, the example substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, such as, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the catalyst composition can be applied in multiple, distinct layers, if desired. In the illustrated embodiment, the catalyst composition consists of both a discrete bottom layer 14 adhered to the walls 12 of the carrier member and a second discrete top layer 16 coated over the bottom layer 14. The present disclosure can be practiced with one or more (such as, e.g., 2, 3, or 4) catalyst layers and is not limited to the two-layer embodiment illustrated in FIG. 1B.

In one or more embodiments, the substrate is a ceramic or metal having a honeycomb structure. Any suitable substrate may be employed, such as, e.g., a monolithic substrate of a type having fine, parallel gas flow passages extending therethrough from an inlet or an outlet face of the substrate such that passages are open to fluid flow therethrough. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as, e.g., trapezoidal, rectangular, square, sinusoidal, hexagonal, oval, circular, etc. Such structures may contain from about 60 to about 900 or more gas inlet openings (i.e., cells) per square inch of cross section.

A ceramic substrate may be made of any suitable refractory material, such as, e.g., cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate, and the like. Substrates useful for the catalyst of embodiments of the present disclosure may also be metallic in nature and be composed of one or more metals or metal alloys. A metallic substrate may include any metallic substrate, such as, e.g., those with openings or "punch-outs" in the channel walls. Metallic substrates may be employed in various shapes such as pellets, corrugated sheet, or monolithic form. Non-limiting examples of metallic substrates include heat-resistant, base-metal alloys, e.g., those in which iron is a substantial or major component. Such alloys may contain one or more elements chosen from nickel, chromium, and aluminum, and the total of these metals may comprise at least about 15 wt. % of the alloy, for instance, about 10 wt. % to about 25 wt. % chromium, about 1 wt. % to about 8 wt. % of aluminum, and about 0 wt. % to about 20 wt. % of nickel, in each case based on the weight of the substrate.

In one or more embodiments in which the substrate is a particulate filter, the particulate filter can be chosen from a gasoline particulate filter or a soot filter. Particulate filters include, but are not limited to, honeycomb wall flow filters, partial filtration filters, wire mesh filters, wound fiber filters, sintered metal filters, and foam filters. In a specific embodiment, the particulate filter is a catalyzed soot filter (CSF). The catalyzed CSF comprises, for example, a substrate coated with a catalyst composition as provided herein.

Wall flow substrates useful for supporting the catalyst material of one or more embodiments may have a plurality of fine, substantially parallel gas flow passages extending along the longitudinal axis of the substrate. In some embodiments, each passage is blocked at one end of a substrate body, with alternate passages blocked at opposite end-faces. Such monolithic substrates may contain up to about 900 or more flow passages (or "cells") per square inch of cross section, although far fewer may be used. For example, the substrate may have from about 7 to about 600, more usually from about 100 to about 400, cells per square inch ("cpsi"). The porous wall flow filter used in embodiments of the disclosure can be characterized in that the wall of the porous wall flow filter has thereon or contained therein a platinum group metal. Catalytic materials may be present on the inlet side of a substrate wall alone, an outlet side alone, both the inlet and outlet sides, or the wall itself may consist all, or in part, of the catalytic material. In another embodiment, the substrate can comprise one or more catalyst layers and combinations of at least two catalyst layers on the inlet and/or outlet walls of the substrate.

Figure 2:
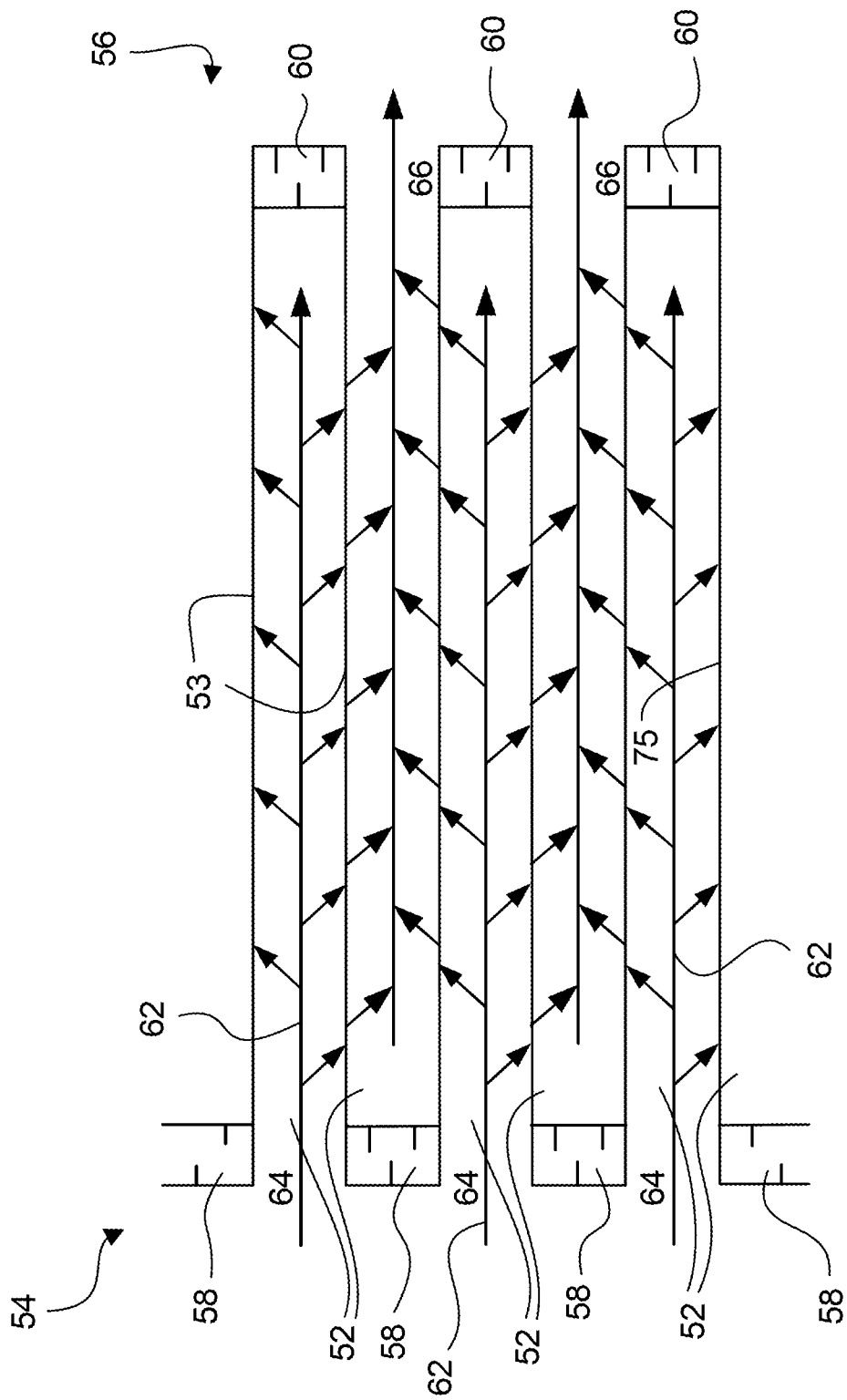
FIG. 2 shows a cross-sectional view of a section of a wall flow filter substrate.

As seen in FIG. 2, an example substrate has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet end 54 and outlet end 56. A gas stream 62 enters through the unplugged channel inlet 64, is stopped by outlet plug 60, and diffuses through channel walls 53 (which are porous) to the outlet end 66. The gas cannot pass back to the inlet side of walls because of inlet plugs 58. The porous wall flow filter used in the disclosure can be characterized in that the wall of the substrate has thereon one or more catalytic materials.

Exhaust Gas Treatment System

A further aspect of the present disclosure is directed to an exhaust gas treatment system. In one or more embodiments, an exhaust gas treatment system comprises an engine, such as, e.g., a lean burn engine, such as, e.g., a diesel engine or a lean burn gasoline engine, and a catalyst composition of the disclosure downstream from the engine.

Figure 3:
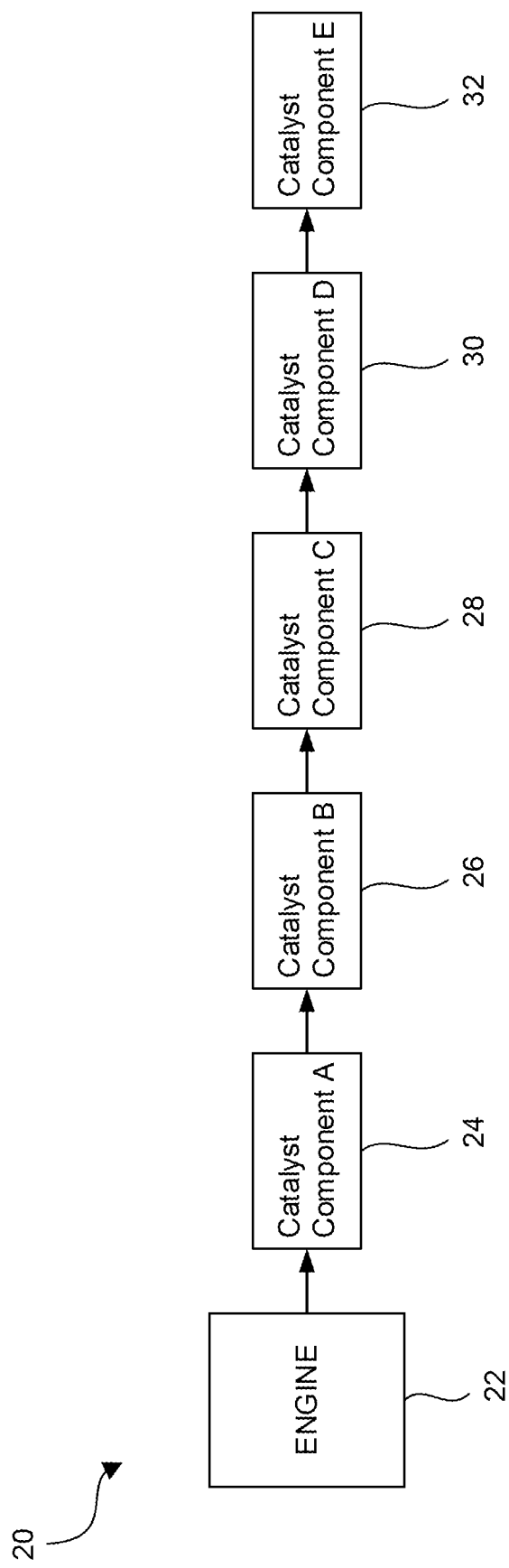
FIG. 3 shows a schematic depiction of an embodiment of an emission treatment system in which a catalyst of the present disclosure is utilized.

One example emission treatment system is illustrated in FIG. 3, which depicts a schematic representation of an emission treatment system 20. As shown, the emission treatment system can include a plurality of catalyst components in series downstream of an engine 22, such as a lean burn gasoline engine. At least one of the catalyst components may be a SCR catalyst of the present disclosure. The catalyst composition provided according to the present disclosure may be combined with numerous additional catalyst materials and may be placed at various positions in comparison to the additional catalyst materials. FIG. 3 illustrates five catalyst components, 24, 26, 28, 30, 32 in series; however, the total number of catalyst components can vary and five components is merely one non-limiting example.

Without limitation, Table 1 presents various exhaust gas treatment system configurations of one or more embodiments. It is noted that each catalyst is connected to the next catalyst via exhaust conduits such that the engine is upstream of catalyst A, which is upstream of catalyst B, which is upstream of catalyst C, which is upstream of catalyst D, which is upstream of catalyst E (when present). The reference to Components A-E in the table can be cross-referenced with the same designations in FIG. 3.

The DOC catalyst noted in Table 1 can be any catalyst conventionally used to abate carbon monoxide (CO) and hydrocarbon (HC) pollutants in the exhaust gas of engines and may comprise, e.g., a platinum group metal (PGM) supported on a refractory metal oxide support (such as, e.g., alumina).

The LNT catalyst noted in Table 1 can be any catalyst conventionally used as a $NO_x$ trap, and may comprise $NO_x$-adsorber compositions that include base metal oxides (BaO, MgO, $CeO_2$, and the like) and a platinum group metal for catalytic NO oxidation and reduction (such as, e.g., Pt and Rh).

TABLE 1

Example configurations

| Component A | Component B | Component C | Component D | Component E |
| --- | --- | --- | --- | --- |
| DOC | DPF | SCR | Optional AMOx | — |
| DOC | SCRoF | Optional AMOx | — | — |
| DOC | LNT | SCRoF | SCR | Optional AMOx |
| DOC | LNT | SCR | Optional AMOx | — |
| DOC | SCRoF | SCR | Optional AMOx | — |

Reference to DPF in the table refers to a diesel particulate filter, which may consist of a wall flow filter adapted to filter particulate matter in the exhaust gas.

Reference to SCR in the table refers to an SCR catalyst, which can include a SCR catalyst composition comprising a metal-exchanged zeolite as described herein. Reference to SCRoF (or SCR on filter) refers to a particulate or soot filter (such as, e.g., a wall flow filter), which can include the SCR catalyst composition provided herein. Where both SCR and SCRoF are present, one or both can include the SCR catalyst provided herein, or one of the catalysts may include a conventional SCR catalyst. The emission treatment system may optionally include an injector positioned upstream of the SCR catalyst and adapted for injecting ammonia or an ammonia precursor (such as, e.g., urea) into the exhaust stream.

Reference to AMOx in the table refers to an ammonia oxidation catalyst, which can be provided downstream of the metal-exchanged zeolite-containing catalyst described herein to remove any slipped ammonia from the exhaust gas treatment system. In specific embodiments, the AMOx catalyst may comprise a PGM component. In one or more embodiments, the AMOx catalyst may comprise a bottom coat comprising a PGM component and a top coat with SCR functionality.

As recognized by one skilled in the art, in the configurations listed in Table 1, any one or more of components A, B, C, D, or E can be disposed on a particulate filter, such as, e.g., a wall flow filter, or on a flow-through honeycomb substrate. In one or more embodiments, an engine exhaust system comprises one or more catalyst compositions mounted in a position near the engine (in a close-coupled position, CC), with additional catalyst compositions in a position underneath the vehicle body (in an underfloor position, UF).

Method of Treating Engine Exhaust

Another aspect of the present disclosure is directed to a method of treating an exhaust gas stream of an engine, such as, e.g., a lean burn engine. The method can include placing a catalyst comprising a metal-exchanged zeolite prepared according to one or more embodiments of the present disclosure downstream from the engine and flowing the exhaust gas stream of the engine over the catalyst. In one or more embodiments, the method further comprising placing additional catalyst components downstream from the engine as noted above.

The disclosure is now described with reference to the following example(s).

EXAMPLE(S)

A study was first conducted at various temperatures and various solids contents ($H_2O/SiO_2$) to evaluate whether any crystallization could be observed at atmospheric pressure to form a CHA product. Trimethyladamantylammonium hydroxide (TMAdaOH) was used as the organic structure directing agent (OSDA), sodium silicate was used as the silica source, and Na-FAU was used as the alumina source.

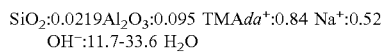

The $OH/SiO_2$ and $Na/SiO_2$ ratios were adjusted by adding sulfuric acid and sodium sulfate respectively, and the following standard addition order was used: $H_2O$, AdaOH, $Na_2SO_4$, $H_2SO_4$, Na-FAU, sodium silicate. The initial temperature study (Table 2) at 15 hour crystallization time was conducted in stirred autoclaves (150 revolutions per minute (rpm)), and showed that the rate of CHA formation increases markedly with decreasing $H_2O/SiO_2$ ratio (increasing solids content of the gel) at all temperatures. Notably, traces of CHA were detected after crystallization at 100° C. in the gel with the highest solids content ($H_2O/SiO_2$=11.7).

TABLE 2

Phase composition after crystallization (15 h, 150 rpm) in 300 mL autoclaves

| Temp | $H_2O/SiO_2$ | | |
|---|---|---|---|
| (° C.) | 33.6 | 16.5 | 11.7 |
| 100 | | | FAU + Trace CHA |
| 110 | | | ~50% CHA + FAU |
| 120 | | FAU | >90% CHA |
| 130 | | ~50% CHA + FAU | >90% CHA |
| 140 | FAU + AMPH | 96% CHA | 95% CHA |

The crystallization of the latter was subsequently attempted at 97° C. in a stirred glass vessel (150 or 350 rpm) with a reflux condenser. Samples were withdrawn periodically during crystallization and analyzed via XRD, as described below.

Figures 4A, 4B:
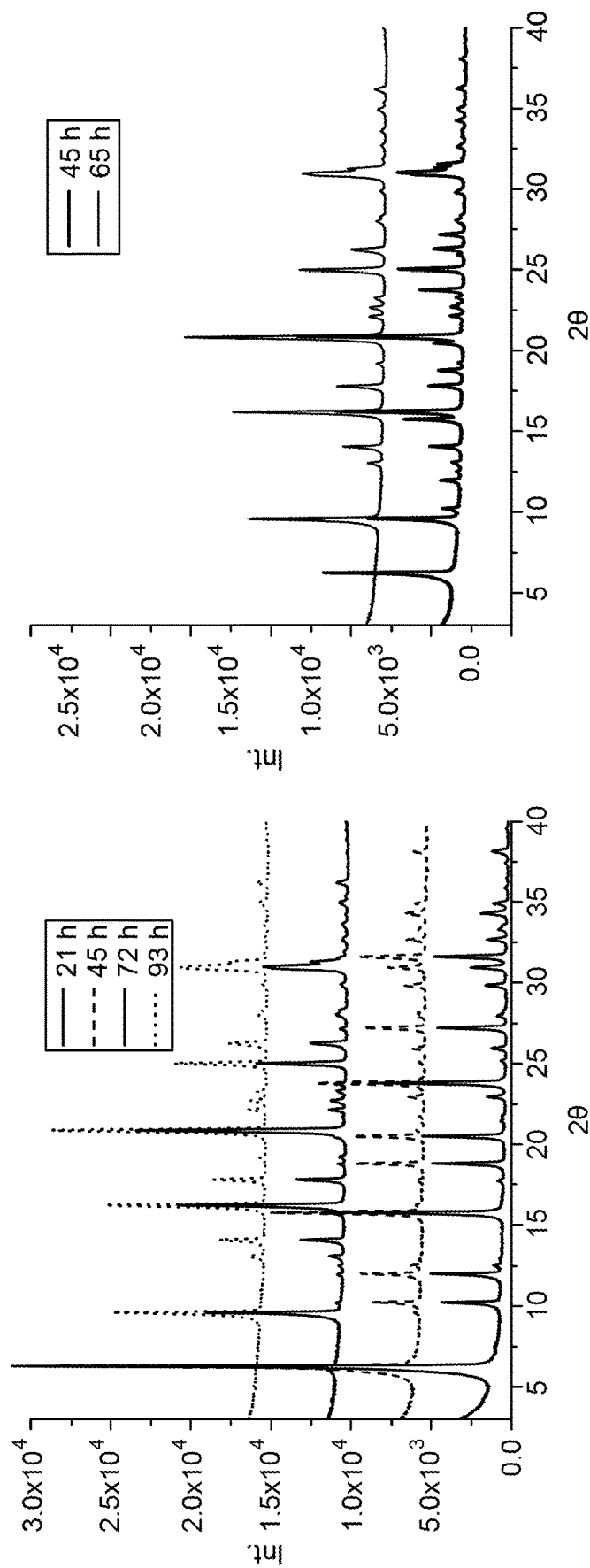
FIGS. 4A and 4B provide X-ray diffraction (XRD) patterns of samples taken during crystallization at 97° C. in a stirred reflux vessel at 150 rpm (FIG. 4A) and 350 rpm (FIG. 4B)
Figure 5B:
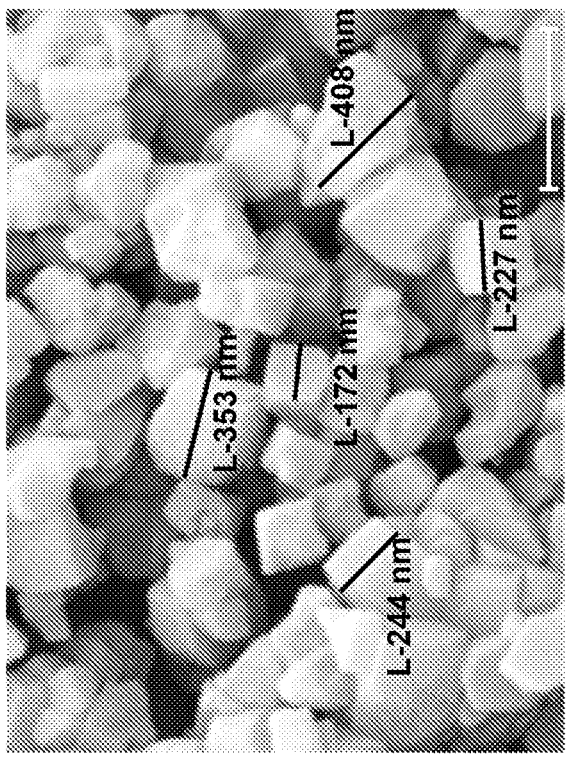
FIG. 5A (scale bar: 5 μm) and 5B (scale bar: 500 nm) provide micrographs of CHA crystallized at 97° C. in a stirred reflux vessel at 350 rpm.
Figure 5A:
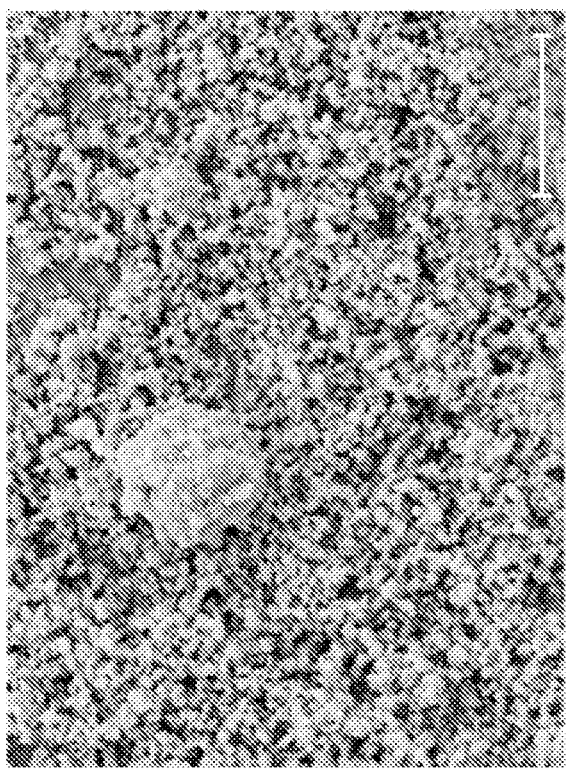

Two trials were carried out to evaluate the possibility of suitably preparing such CHA zeolites at atmospheric pressure, stirred at different rpm values. The diffraction patterns of these samples are shown in FIGS. 4A and 4B for two crystallization trials: at 150 rpm (FIG. 4A) and at 350 rpm (FIG. 4B). At 150 rpm, the crystallization of CHA began after 45 hours and was completed by 93 hours at temperature. Except FAU and CHA, no other phases or amorphous materials were observed in the samples. Upon increasing the stirring rate to 350 rpm, complete conversion of FAU is achieved between 45 and 65 hours at 97° C. Micrographs of the final CHA product (SAR=20) obtained from the gel crystalized at 350 rpm are shown in FIGS. 5A and 5B. The material displayed high crystallinity (95% CHA) and a corresponding high surface area (ZSA=560 m$^2$/g, MSA=40 m$^2$/g).

The as-prepared CHA product from the 150 rpm crystallization was calcined (540° C.) to remove the OSDA and subsequently ammonium exchanged. The $NH_4^+$ form, containing 1000 ppm residual $Na_2O$, was calcined (450° C.) to yield the $H^+$ form. CuO was introduced to attain a CuO loading of 4.6 wt. % (Sample A). It should be noted that the ambient pressure crystallization (97° C. for 72-100 hours) of a conventional CHA zeolite gel, known to yield an SAR 20 CHA product at hydrothermal conditions (140-170° C. for 15-30 hours), did not yield a crystalline product.

A comparative sample (Comparative Sample B) was prepared by hydrothermal crystallization (170° C., 30 hours). This gel, referred to as the "comparative gel" was prepared using the composition below (without a zeolitic alumina source), with aluminum triisopropoxide and colloidal silica used as the alumina and silica sources, respectively.

This comparative sample was then calcined, ammonium exchanged, calcined, and ion exchanged with CuO (as for Sample A), giving a crystalized SAR=20 CHA with 5.1 wt. % CuO loading.

Catalytic coatings containing Sample A and Comparative Sample B, alumina, and zirconium oxide binder were disposed via a washcoat process on cellular ceramic monoliths having a cell density of 400 cpsi and a wall thickness of 6 mil. The coated monoliths were dried at 130° C. and calcined at about 550° C. for 1 hour. The coating process provided a catalyst loading of 2.2 g/in$^3$, of which 5% was alumina and 5% was zirconium oxide binder. The coated monoliths were hydrothermally aged in the presence of 10% H$_2$O/air at 650° C. for 50 hours (HDD) NO$_x$ conversions of 650° C. aged samples were measured in a laboratory reactor at a gas hourly volume-based space velocity of 120000 h$^{-1}$ under pseudo-steady state conditions in a gas mixture of 1000 ppm NO, 1000 ppm NH$_3$, 10% O$_2$, 10% H$_2$O, balance N$_2$ in a temperature ramp of 2.5° C./min from 175° C. to 600° C.

Figure 6:
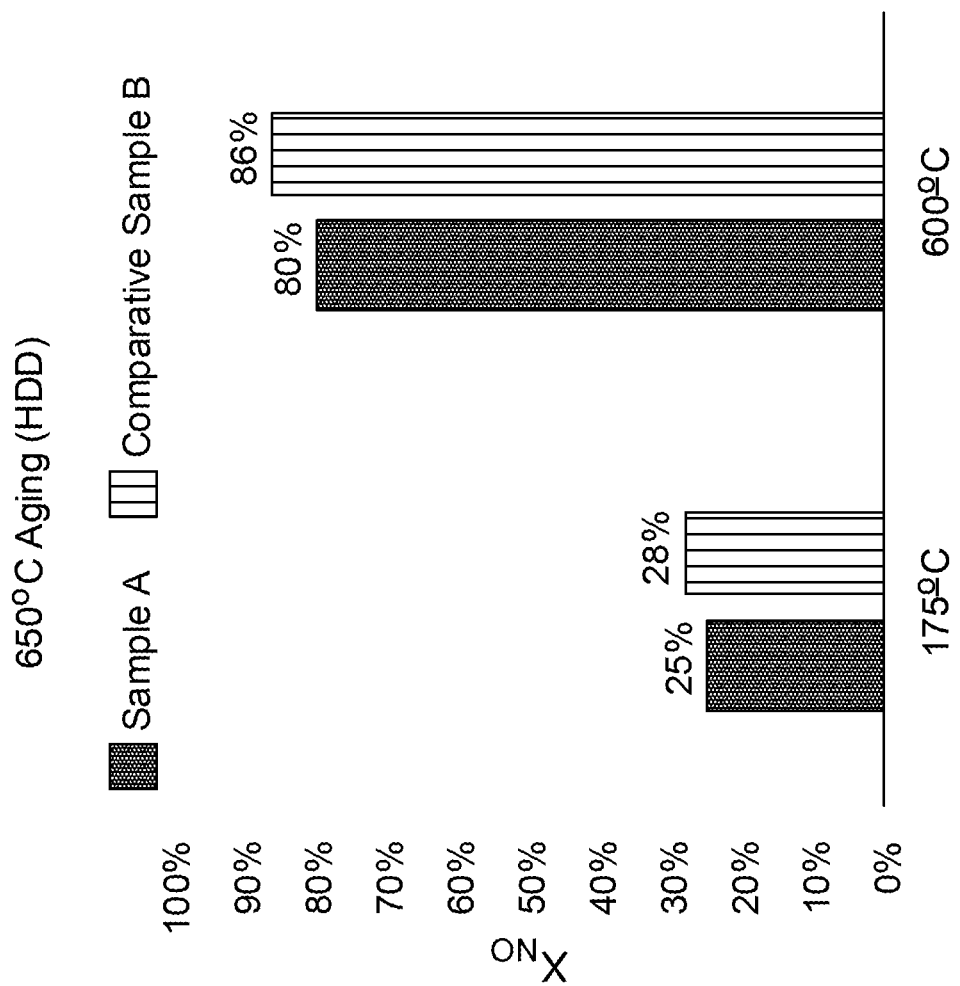
FIG. 6 illustrates the SCR performance of selected samples from the Experimental section below.

NOx conversion at 175° C. and 600° C. after 650° C. aging is shown in FIG. 6, for the coated catalyst comprising Sample A and the coated catalyst comprising Comparative Sample B. As shown, a slightly lower but comparable performance after HDD aging is observed for Sample A as compared to Comparative Sample B, and this difference can be attributed to the lower CuO content of Sample A.

It will be readily apparent to one of ordinary skill in the relevant arts that suitable modifications and adaptations to the compositions, methods, and applications described herein can be made without departing from the scope of any embodiments or aspects thereof. The compositions and methods provided are intended to serve as examples and are not intended to limit the scope of the embodiments. All of the various embodiments, aspects, and options disclosed herein can be combined in all variations. The scope of the compositions, formulations, methods, and processes described herein include all actual or potential combinations of embodiments, aspects, options, and examples herein. All patents and publications cited herein are incorporated by reference herein for the specific teachings thereof as noted unless other specific statements of incorporation are specifically provided.

What is claimed is:

1. A method of synthesizing an aluminosilicate zeolite with a silica-to-alumina molar ratio (SAR) of 10 or greater, comprising:
    forming a reaction mixture comprising at least one alumina source, at least one silica source, and at least one organic structure directing agent, wherein the reaction mixture has a solids content of about 10% or greater, and H$_2$O/SiO$_2$ molar ratio of the reaction mixture is about 15 or less; and
    crystallizing the reaction mixture at a temperature of about 100° C. or less in an open vessel open to an atmosphere at atmospheric pressure to form the aluminosilicate zeolite;
    wherein the at least one alumina source comprises a zeolite with an FAU, LTL, LTA, or MOR crystalline framework.

2. The method of claim 1, wherein the aluminosilicate zeolite comprises zeolites with an 8 ring pore size.

3. The method of claim 1, wherein the aluminosilicate zeolite comprises zeolites with frameworks containing double six ring (D6r) subunits.

4. The method of claim 1, wherein the aluminosilicate zeolite comprises zeolites with frameworks chosen from AEI, AFX, CHA, LEV, AFT, EAB, KFI, SAT, TSC, SAV, ERI, LTA, and combinations of any of the preceding.

5. The method of claim 1, wherein the aluminosilicate zeolite comprises zeolites with a CHA crystalline framework.

6. The method of claim 1, wherein the aluminosilicate zeolite has an SAR of 15 or greater.

7. The method of claim 1, wherein the aluminosilicate zeolite has an SAR of 20 or greater.

8. The method of claim 1, wherein the aluminosilicate zeolite has an SAR of 10 to 30.

9. The method of claim 1, wherein the solids content of the reaction mixture is about 15% or greater.

10. The method of claim 1, wherein the zeolite with an FAU crystalline framework is zeolite Y.

11. The method of claim 1, wherein the at least one organic structure directing agent is a quaternary ammonium salt with at least one substituent chosen from alkyl substituents, aromatic substituents, and combinations of any of the preceding.

12. The method of claim 1, wherein the at least one organic structure directing agent is tetramethylpiperidinium.

13. The method of claim 1, wherein the temperature ranges from about 95° C. to about 100° C.

14. The method of claim 1, wherein the vessel is a stirred vessel adapted with a reflux condenser.

15. The method of claim 1, wherein crystallizing the reaction mixture is conducted under stirring.

16. The method of claim 1, wherein the at least one silica source comprises an alkali metal silicate solution.

17. The method of claim 1, further comprising calcining the aluminosilicate zeolite to form a calcined zeolite in a H$^+$ form or a Na$^+$ form.

18. The method of claim 17, further comprising ion-exchanging the calcined zeolite with a promoter metal to form an ion-exchanged zeolite catalyst.

19. The method of claim 1, further comprising ion-exchanging the aluminosilicate zeolite with a promoter metal to form an ion-exchanged zeolite catalyst.

20. The method of claim 19, wherein the promoter metal is Fe or Cu.

21. The method of claim 1, wherein the molar ratio of water to silica H$_2$O/SiO$_2$ ratio of the reaction mixture is less than 12.

22. A method of synthesizing an aluminosilicate zeolite with a silica-to-alumina molar ratio (SAR) of 10 or greater, comprising:
    forming a reaction mixture comprising at least one alumina source, at least one silica source, and at least one organic structure directing agent, wherein the reaction mixture has a solids content of about 10% or greater, and H$_2$O/SiO$_2$ molar ratio of the reaction mixture is about 15 or less; and
    crystallizing the reaction mixture at a temperature of about 100° C. or less in an open vessel open to an atmosphere at atmospheric pressure to form the aluminosilicate zeolite;
    wherein the at least one silica source comprises an alkali metal silicate solution.

23. A method of synthesizing an aluminosilicate zeolite with a silica-to-alumina molar ratio (SAR) of 10 or greater, comprising:
    forming a reaction mixture comprising at least one alumina source, at least one silica source, and at least one organic structure directing agent, wherein the reaction mixture has a solids content of about 10% or greater, and H$_2$O/SiO$_2$ molar ratio of the reaction mixture is about 15 or less; and
    crystallizing the reaction mixture at a temperature of about 100° C. or less in an open vessel open to an atmosphere at atmospheric pressure to form the aluminosilicate zeolite; further comprising calcining the aluminosilicate zeolite to form a calcined zeolite in a H$^+$ form or a Na$^+$ form.

24. The method of claim 23, further comprising ion-exchanging the calcined zeolite with a promoter metal to form an ion-exchanged zeolite catalyst.

* * * * *